United States Patent [19]

Morokuma

[11] 3,976,379
[45] Aug. 24, 1976

[54] INTERFEROMETERS
[75] Inventor: Tadashi Morokuma, Toyko, Japan
[73] Assignee: Olympus Optical Co., Ltd., Tokyo, Japan
[22] Filed: Dec. 26, 1973
[21] Appl. No.: 428,899

[30] Foreign Application Priority Data
Dec. 28, 1972 Japan.................................. 48-2471
Apr. 26, 1973 Japan.............................. 48-48056
May 11, 1973 Japan.............................. 48-52397
June 28, 1973 Japan.............................. 48-73171
June 30, 1973 Japan.............................. 48-73851

[52] U.S. Cl............................. 356/106 R; 356/113
[51] Int. Cl.².......................................... G01B 9/02
[58] Field of Search........................ 356/106 R, 113

[56] References Cited
UNITED STATES PATENTS
3,529,894  9/1970  Hock .................................... 356/113
3,601,490  8/1971  Erickson ......................... 356/106 R
3,822,942  7/1974  Hock............................. 356/106 R OTHER PUBLICATIONS
Bennett, "A Double–Passed Michelson Interferometer," *Optics Communications*, vol. 4, No. 6, pp. 428–430, Feb./Mar., 1972.
Francon et al., *Polarization Interferometers*, Wiley–Interscience, London, pp. 3–5, 1971.

*Primary Examiner*—John K. Corbin
*Assistant Examiner*—Matthew W. Koren
*Attorney, Agent, or Firm*—Haseltine, Lake & Waters

[57] ABSTRACT

Interferometers for precise determination of lengths and more particularly, a highly sensitive interferometer which can produce interference fringes one fringe separation of which corresponds to $\lambda/2N$ ($\lambda$ is a wavelength of an incident light and N is an integer which is 2, 3, 4 . . . ). The interferometer comprises light emitting means at least one beam splitting means, retroreflecting optical means and bilateral reflecting optical means. Two embodiments of the beam splitting means are provided. The corresponding prisms in both preferred embodiments have the same effect of dividing an incident light into a reference light beam and a measuring light beam, but the configuration and construction of the equivalent prisms of the two embodiments differ slightly in order to provide mutually perpendicular light paths for the divided light beams. Rotator means are provided between the beam splitting means and the bilateral reflecting optical means in one embodiment, between the beam splitting means and the retroreflecting optical means in another embodiment, and between the beam splitting means on the one hand and the bilateral reflecting optical means and retroreflecting optical means on the other hand in a further embodiment. The light paths traversing the bilateral reflecting optical means are common to those traversing the reference and measuring retroreflecting optical means.

14 Claims, 26 Drawing Figures

FIG_1
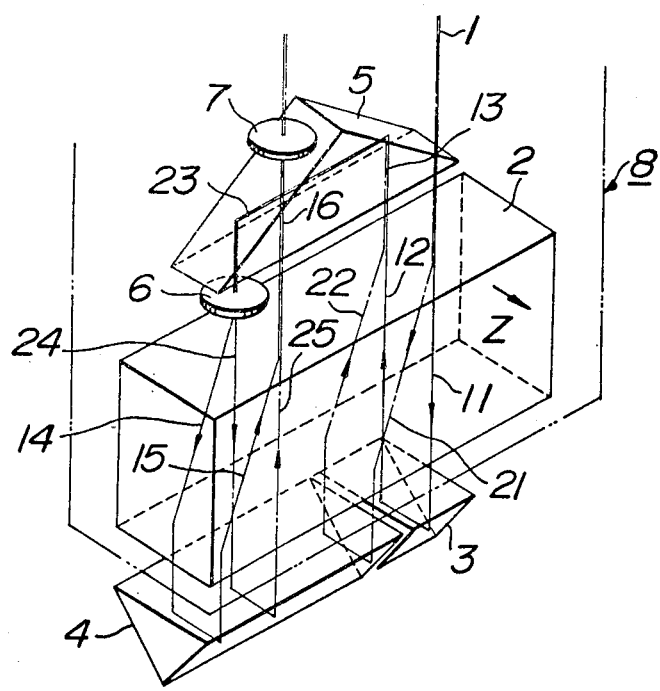
FIG_2
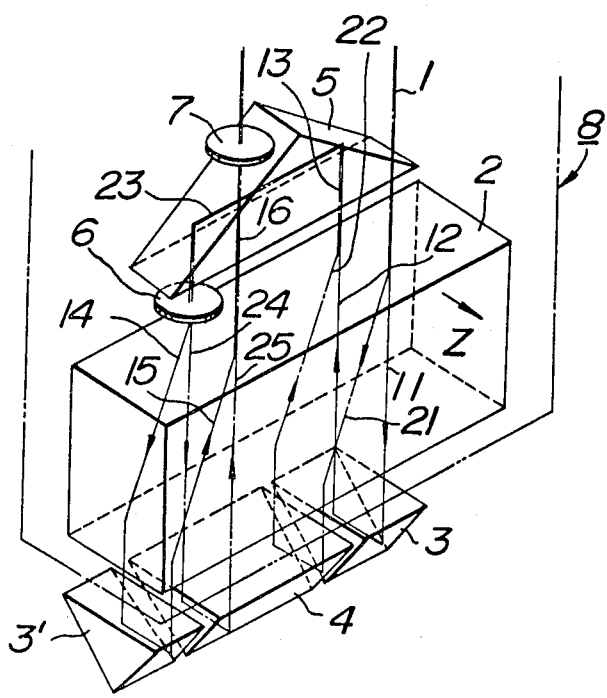

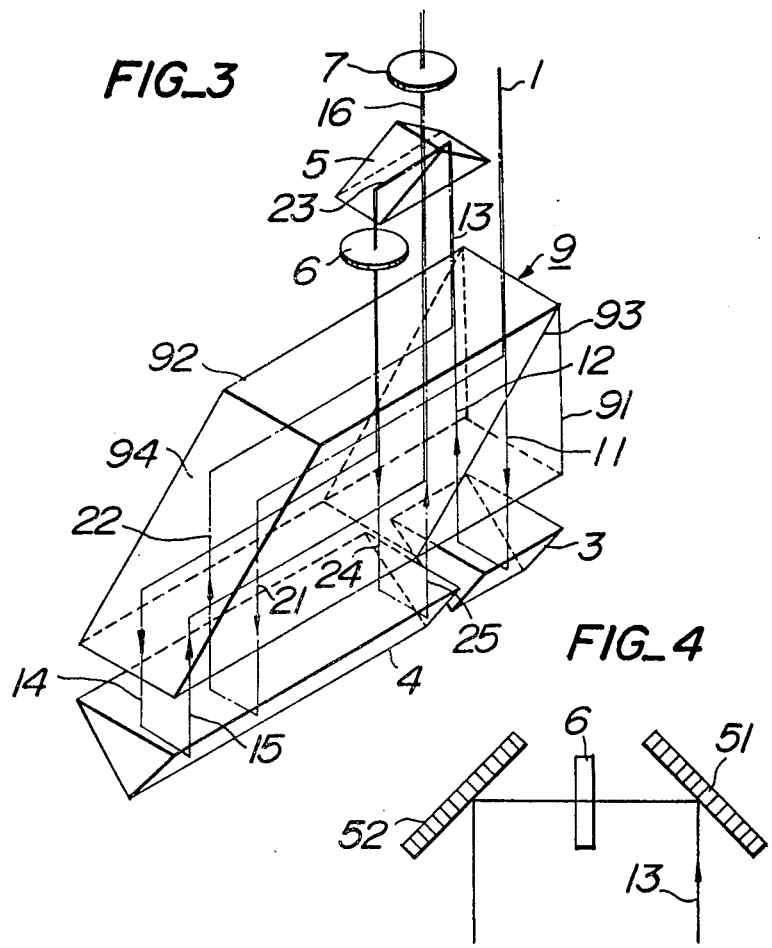
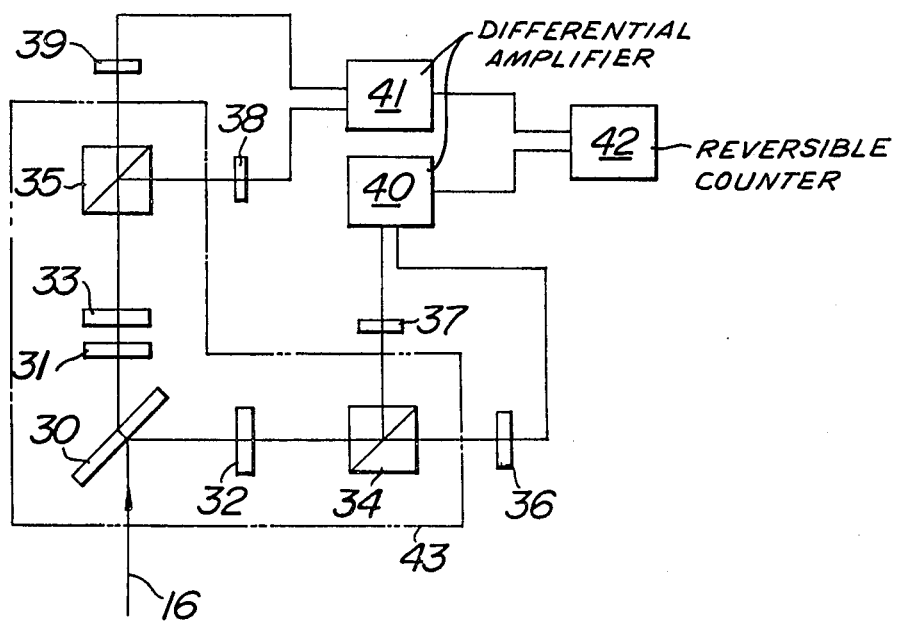

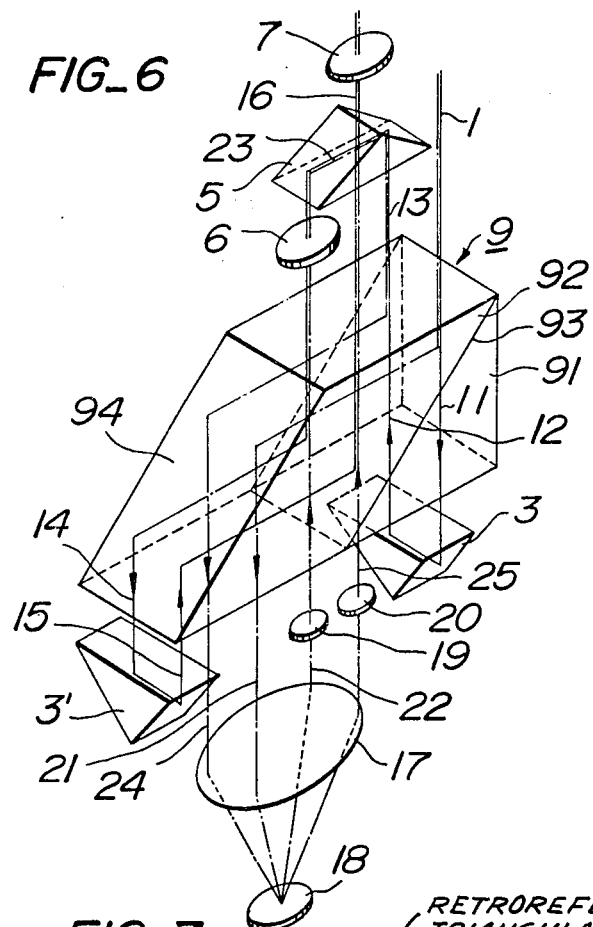
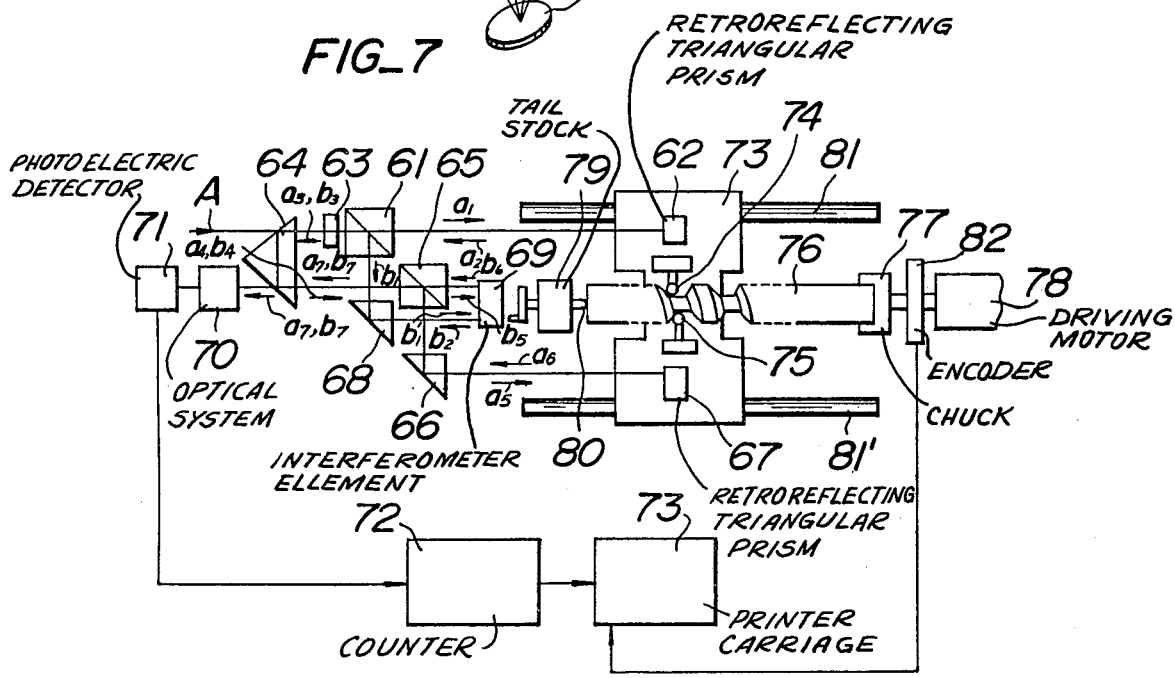

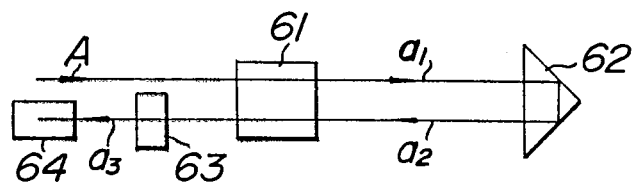
FIG_8
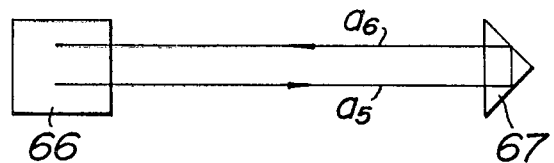
FIG_9
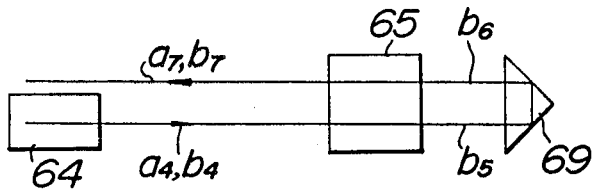
FIG_10
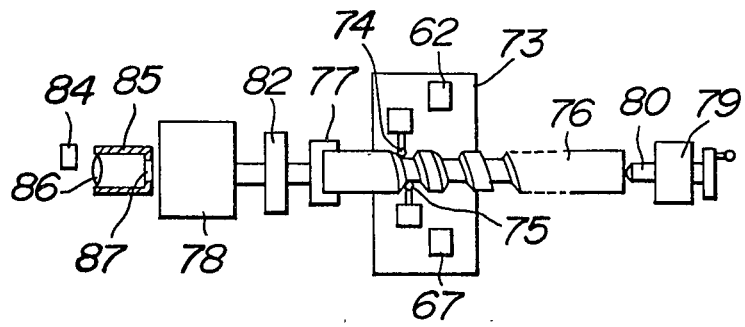
FIG_11
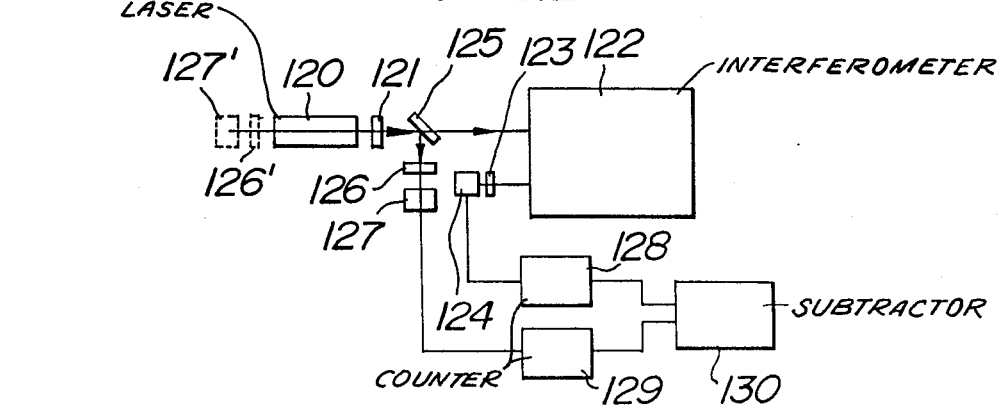
FIG_12

FIG_13
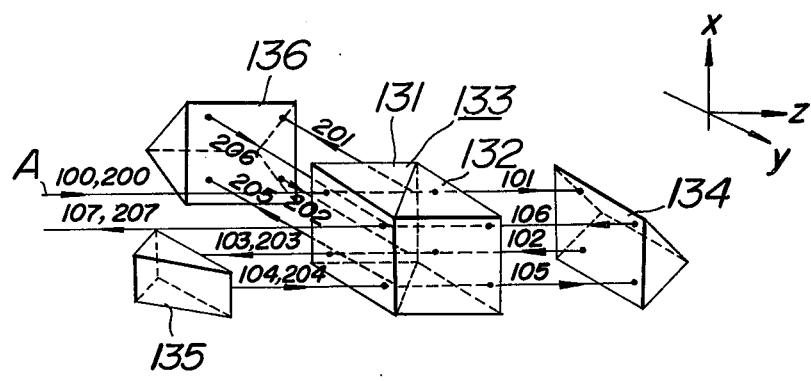
FIG_14
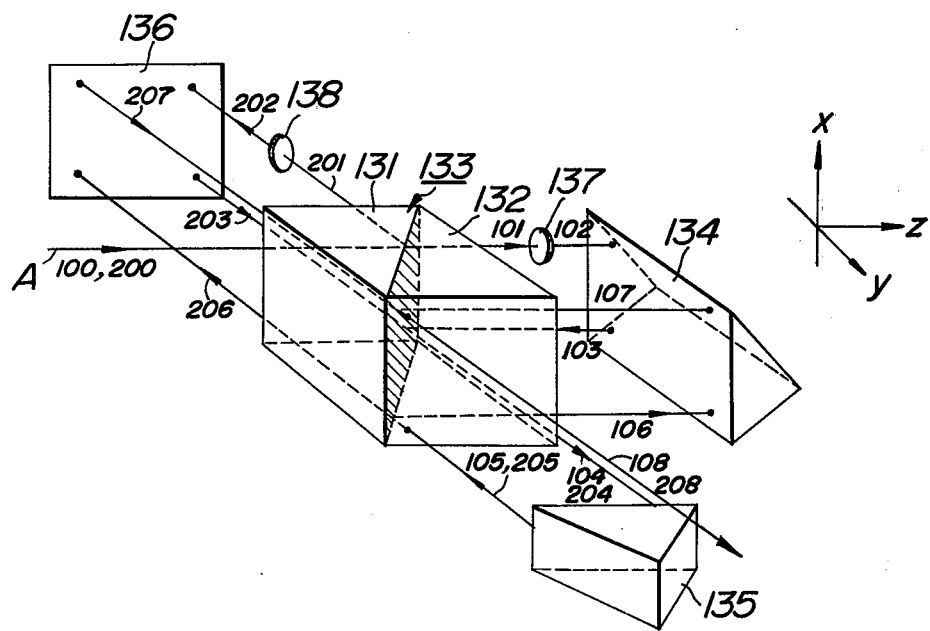

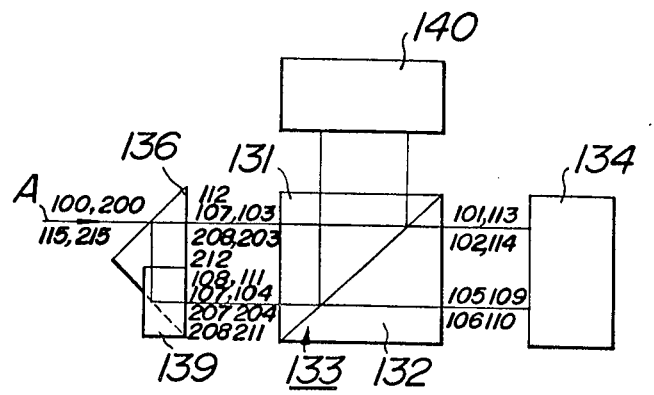
FIG_15a
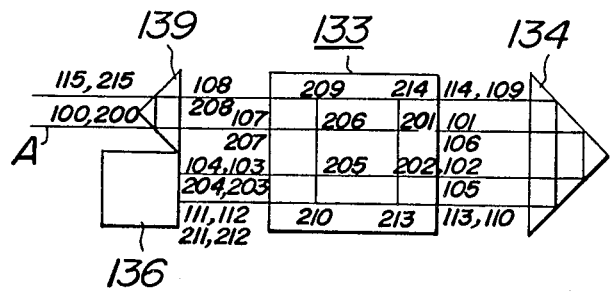
FIG_15b
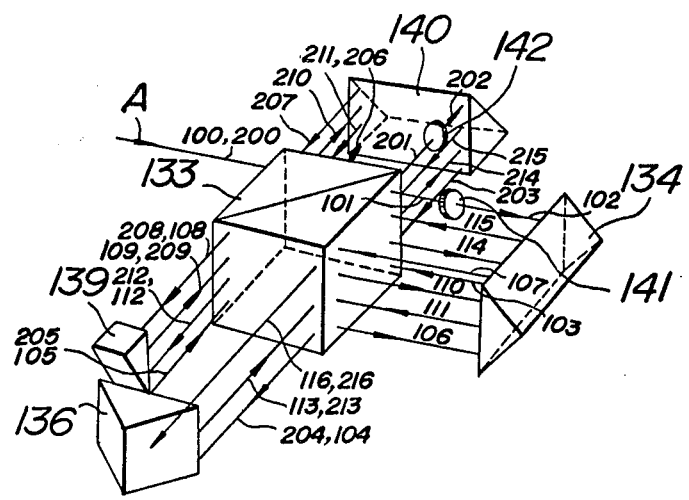
FIG_16

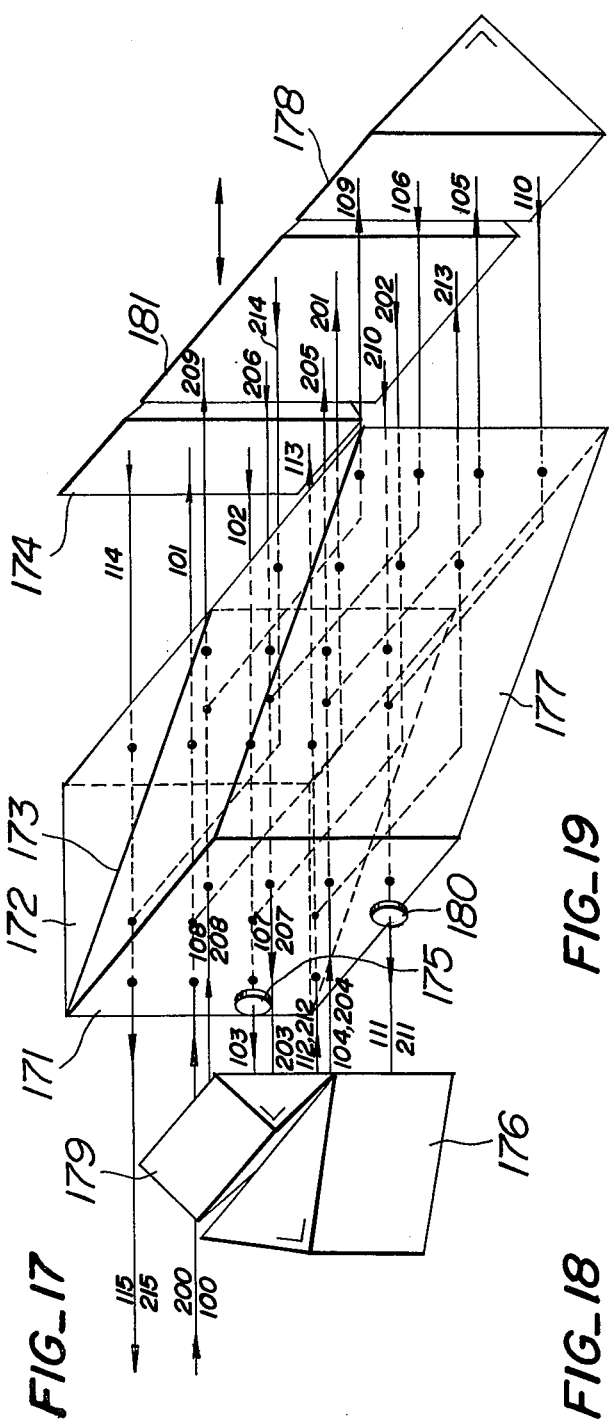
FIG_17
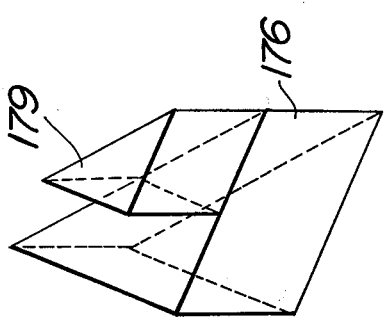
FIG_19
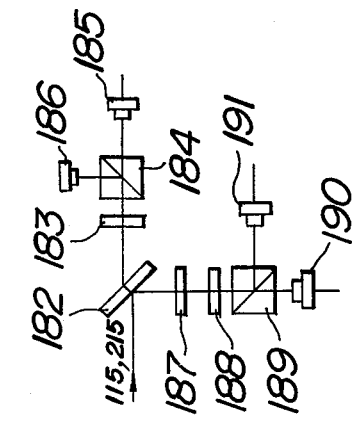
FIG_18

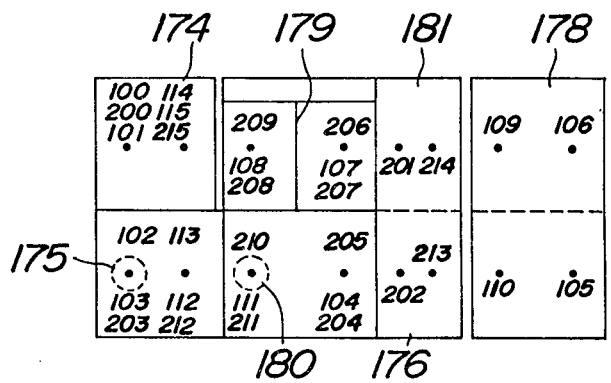
FIG_20
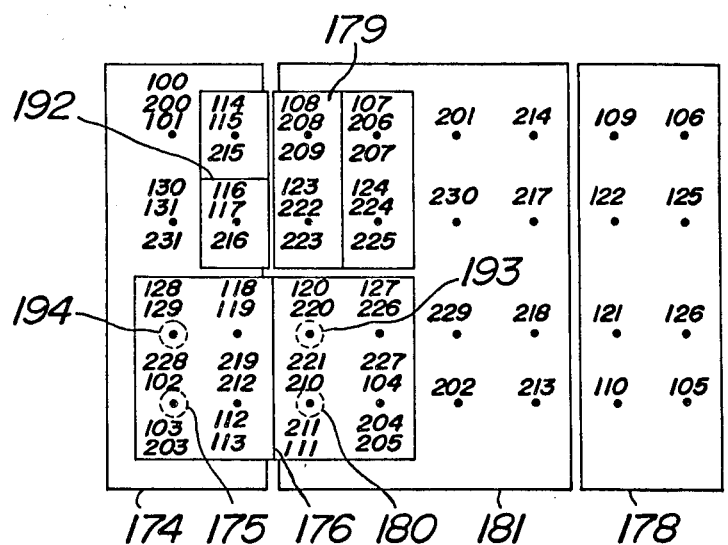
FIG_21
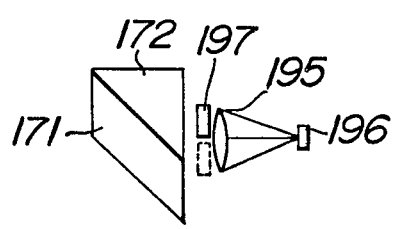
FIG_22
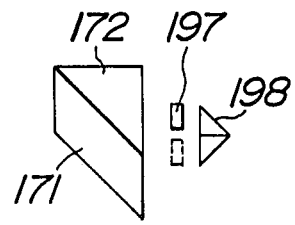
FIG_23

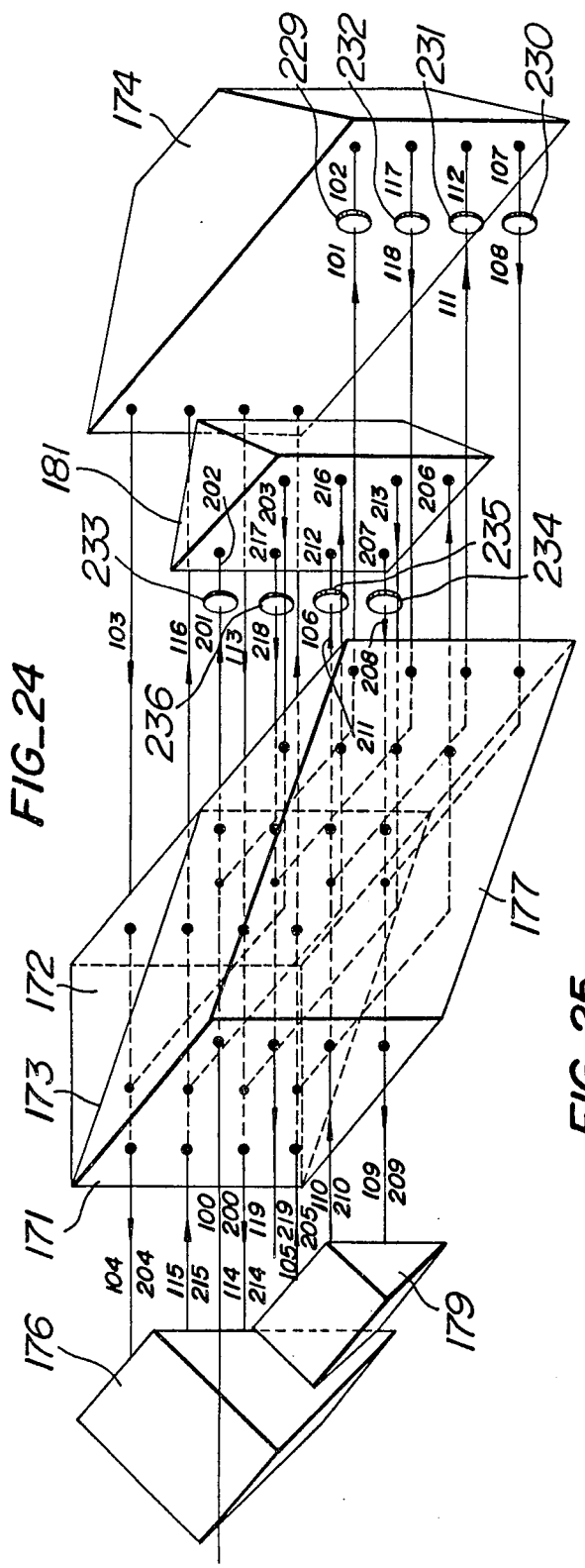
FIG_24
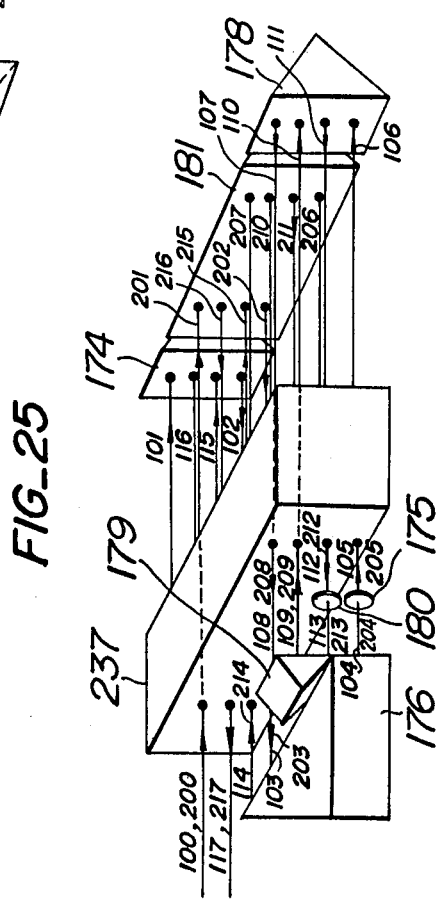
FIG_25

INTERFEROMETERS

This invention relates to interferometers for precise determination of lengths and more particularly, to a highly sensitive interferometer which can produce interference fringes one fringe separation of which corresponds to λ/2N (λ is a wavelength of an incident light and N is an integer which is 2, 3, 4 . . . ).

In order to detect a very small linear displacement of an object to be measured on the order of Angstrom by means of an interferometer in a highly precise manner, the interferometer itself must be stable in position and an inclination of the interferometer as a whole must not have an influence upon the precise determination of lengths.

As one of means of stabilizing the interferometer per se, heretofore, it has been proposed to utilize the principle of so-called common path interference. This consists in that two light beams to be interfered with each other are caused to travel a common light path as far as possible, and in that the path difference is not affected even when the alignment of the interferometers changes due to, for example, thermal or mechanical causes.

In such a construction as the Michelson interferometer which has heretofore been used as an interferometer for precise determination of lengths in general, there is a risk of a part or whole of the interferometer being inclined by various causes. This inclination results in a change in length of the light path of either a reference light beam or a measuring light beam, and as a result, the measuring light beam is subjected to a change other than the change of the light beam per se, thereby making it difficult to obtain a stabilized interference fringe.

Heretofore, it has been proposed to provide an interferometer for precise determination of lengths, which makes use of an autocollimator or a special trilateral reflecting mirror for the purpose of obviating the Abbe's error.

The use of the autocollimator, however, has the disadvantages that the Abbe's error must be corrected in an electrically complex manner, and that the autocollimator becomes worse in precision due to floating of the air and the like.

The use of the trilateral reflecting prism has the disadvantage that the trilateral reflecting prism must be arranged in a three dimensional manner so that its adjustment in position becomes complex, and that the light beams for producing the interference fringe are not located in the same plane on which an object being measured is positioned so that the interferometer becomes complex in construction.

In addition, both these conventional interferometers produce interference fringes one fringe separation of which corresponds to λ/4, and as a result, their sensitivity is low.

Heretofore, it has been proposed to insert an optical system for folding a reference optical path and a measuring optical path for the purpose of increasing the sensitivity of the interferometer. Such kind of an interferometer has the disadvantage that the optical system inserted for the purpose of folding the optical path must have a highly precise surface and must be made of a material having an extremely homogeneous property. As a result, the interferometer becomes excessively expensive.

In general, the sensitivity of an interferometer can be improved through the frequent folding of the light path by means of a suitable means. In the means heretofore proposed, an optical system consisting of a combination of reflecting optical systems such as a plane mirror, corner cube mirror and the like is arranged in the reference light path and in the measuring light path separately so as to fold the light path.

Such conventional means, however, has the disadvantage that in order to obtain uniform interference fringes the surface precision of the optical system for folding the light path must be made extremely high, and that the adjustment must be effected by a highly skilled operator. If use is made of a light path folding optical system common to both the reference and the measuring light paths, it is possible to lower the surface precision of the optical system for folding the light path and make the adjustment easy.

In case of precisely determining lengths by means of the interferometer, reflecting optical systems are relatively moved in the direction of optical axis. In this case, if one of the reflecting optical systems is rotated, the light beam is transversely displaced. As a result, if a coherent light incident on the interferometer has a small cross section, the transverse displacement of the light beam results in a reduction of the area on which interference fringes are produced. As a result, in case of photoelectrically detecting the interference fringes, the modulated output from a photoelectric detector is decreased to reduce the contrast of the apparent interference fringes.

This is particularly important when the interferometer is provided for a carriage of a large machine tool. If the carriage is moved, for example, by 10 meters and during its movement if it is inclined from the horizontal direction by an angle of 40'', the amount of transverse displacement of the light beam becomes equal to $2 \times 10 m \times (2 \times 10^{-4} rad) = 4$ mm. As a result, even though the diameter of the light beam is on the order of 10 millimeters, the distinctness of the apparent interference fringes, due to the transverse displacement of the light beam, becomes considerably decreased.

An object of the invention is to provide an interferometer for precise determination of lengths wherein two light beams to be interfered with each other are caused to travel a common light path as far as possible and even when the interferometer is slightly misaligned due to various causes, these light paths are prevented from being changed in the path difference, thereby obtaining stabilized interference fringes.

Another object of the invention is to provide an interferometer which can make one fringe separation λ/4, obtain a contrast of the interference fringes independently of the alignment of moving mirrors and the like constituting the interferometer.

A further object of the invention is to provide an interferometer for precise determination of lengths which can obviate the Abbe's error in a less expensive manner without utilizing the autocollimator or trilateral reflecting mirror.

A still further object of the invention is to provide an interferometer which does not make use of a highly precise optical system for the purpose of folding the light path and which is highly sensitive and less expensive.

Another object of the invention is to provide an interferometer which makes use of a laser as a light source and which can obviate the influence of the reflected light emerging from the interferometer upon the laser, i.e., can obviate so-called back talk.

A further object of the invention is to provide a highly sensitive interferometer which makes use of a light path folding optical system common to both the reference and the measuring light paths.

Another object of the invention is to provide a highly sensitive interferometer which can utilize a laser as a light source without involving a back talk phenomenon in which the reflected light from the interferometer has an effect upon the laser.

Another object of the invention is to provide a highly sensitive interferometer completely symmetrical as a whole and having an optical system substantially common to both the reference and measuring light paths and capable of changing the path difference only by a relative displacement between the reference reflector and the measuring reflector without changing the path difference by inclination of a beam splitter or the reference and measuring reflectors.

Another object of the invention is to provide an interferometer which can measure not only minute displacement but also the pitch or drunkenness error of screw threads or the pitch of a rack.

A further object of the invention is to provide a highly sensitive interferometer which can produce interference fringes one fringe separation of which corresponds to $\lambda/2N$ ($\lambda$ is a wavelength of an incident light and N is an integer which is 2, 3, 4 . . .).

The invention will now be described in detail in connection with the attached drawings, wherein:

FIG. 1 is a perspective view showing a preferred exemplary embodiment of the interferometer for precise determination of lengths according to the invention;

FIG. 2 is a perspective view showing a modified embodiment of retroreflecting optical means shown in FIG. 1;

FIG. 3 is a perspective view showing a modified embodiment of beam splitting means shown in FIG. 1;

FIG. 4 is a diagrammatic sectional view showing a modified embodiment of bilateral reflecting optical means shown in FIGS. 1 to 3;

FIG. 5 is a block diagram showing a device for photoelectrically detecting interference fringes;

FIG. 6 is a perspective view showing another modified retroreflecting optical means according to the invention;

FIG. 7 is a plan view showing the inventive interferometer applied to measure the pitch or drunkeness error of screw threads;

FIGS. 8 to 10 are front elevations showing optical elements and light paths shown in FIG. 7;

FIG. 11 is a plan view showing a modified embodiment of the interferometer shown in FIG. 7;

FIG. 12 is a plan view showing another modified embodiment of the interferometer shown in FIG. 7;

FIG. 13 is a perspective view showing another embodiment of the interferometer according to the invention;

FIG. 14 is a perspective view showing a modified embodiment of the interferometer shown in FIG. 13;

FIG. 15a is a plan view of another modified embodiment of the interferometer shown in FIG. 13;

FIG. 15b is the front elevation of FIG. 15a;

FIG. 16 is a perspective view showing a still further embodiment of the interferometer shown in FIG. 13;

FIG. 17 is a perspective view showing another embodiment of the interferometer according to the invention;

FIG. 18 is a plan view showing a device for photoelectrically detecting interference fringes;

FIG. 19 is a perspective view showing modified bilateral reflecting optical means of the interferometer shown in FIG. 17;

FIG. 20 is a front elevation showing the construction and light paths of another embodiment of the interferometer according to the invention, seen from the incident light side;

FIG. 21 is a front elevation showing the construction and light paths of a modified embodiment of the interferometer shown in FIG. 20;

FIG. 22 is the plan view showing a relative arrangement between the beam splitting means shown in FIG. 17 and the rotator and a cat's eye;

FIG. 23 is the plan view showing a relative arrangement between the beam splitting means shown in FIG. 17, the rotator and a corner cube prism;

FIG. 24 is a perspective view showing the construction and light paths of a still further embodiment of the interferometer shown in FIG. 17; and FIG. 25 is a perspective view showing the construction and light paths of another embodiment of the interferometer according to the invention.

In FIG. 1 is shown an exemplary embodiment of the interferometer for precise determination of lengths according to the invention. Reference numeral 1 designates a thin coherent incident light, for example, a laser light incident on a beam splitting plate 2, i.e. a double refraction crystal plate made, for example, of calcite whose optical axis is inclined from the direction of the incident light. The light incident on the double refractive crystal plate 2 is separated into an ordinary light beam that oscillates in a plane perpendicular to a plane including the optical axis of the plate 2 and an extraordinary light beam that oscillates in the plane including the optic axis of the plate 2. These ordinary and extraordinary light beams travel unequal optical paths 11, 21, respectively.

The ordinary light beam travelling the optical path 11 shown by a full line after passing through the crystal plate 2 is reflected by a retroreflecting triangular prism 3, constituting appropriate optical means, and travels an optical path 12 through the crystal plate 2. The extraordinary light beam travelling the optical path 21 shown by dot and dash lines after passing through the crystal plate 2 is reflected by another retroreflecting triangular prism 4 and travels an optical path 22 through the crystal plate 2.

The ordinary and extraordinary light beams reincident on the crystal plate 2 are reunited, travel a common optical path 13 and are incident on a bilateral reflecting triangular prism 5 whose edge line of the bilateral reflecting surfaces is substantially perpendicular to those of the retroreflecting prisms 3, 4.

The light beam incident on the bilateral reflecting prism 5 is reflected by it in the same direction from which it came. The light beam emerging from the bilateral reflecting prism 5 passes through a rotator 6 which can rotate the polarizing plane of the light traversing it by 90° and is incident again on the crystal plate 2.

The light beam incident again on the crystal plate 2 is separated into two light beams that travel unequal optical paths 14, 24 and emerge from the crystal plate 2. The light beams travelling along the light paths 14, 24 are incident on the bilateral reflecting prism 4 and after reflected incident again on the crystal plate 2 and travel light paths 15, 25 within the crystal plate 2.

These light beams along the light paths 15, 25 after passing through the crystal plate 2 are reunited and are allowed to emerge therefrom. If the light beam emerged from the crystal plate 2 is incident on a polarizing element such as a polarizing plate 7 whose polarizing axes are inclined from the polarizing direction of the light traversing it by 45°, it is capable of detecting interference fringes corresponding to the path difference between the two polarized light beams.

As seen from the above, there are two light paths, that is, a light path (I): 1 → 11 → 12 → 13 → 23 → 14 → 15 → 16 and a light path (II): 1 → 21 → 22 → 13 → 23 → 24 → 25 → 16. The light beam travelling the optical path (I) is reflected once by the prisms 3, 4, respectively, while the light beam travelling the optical path (II) is reflected twice by the prism 4.

Since the light beam travelling the light path (I) is located outside the light beam travelling the light path (II) with respect to the prisms 3, 4 and these two light paths I and II pass through the same crystal plate 2, the distance between the light paths 11 and 21 is the same as that between the light paths 14 and 24. As a result, even when that part of the interferometer which is surrounded by two dotted chain lines 8 as a whole is inclined or displaced with respect to the prisms 3, 4, the path difference between these two light paths I and II is not changed at all. That is, a relative displacement or rotation between the prisms 3, 4 and the interferometer portion 8 has no effect upon the interference fringes, so that it is possible to obtain extremely stable interference fringes.

Either of the retroreflecting triangular prisms 3, 4 may be used as a movable reflecting mirror of the interferometer when it is used for the precise determination of lengths. In this case, one of the retroreflecting triangular prisms 3, 4 may be made stationary, while the other may be made movable. If the wavelength of the incident light beam is λ, the intensity of the interference fringes periodically changes every time the relative displacement between the rectangular prisms 3 and 4 is effected by λ/2.

In FIG. 2 is shown another embodiment of the interferometer according to the invention. The retroreflecting triangular prism 4 shown in FIG. 1 is divided here into two prisms 3' and 4 and the prism 3' is secured to a supporting base to which is secured the prism 3. The other constructional elements are the same as those shown in FIG. 1.

In the present embodiment, the light beam travelling the ordinary light beam path 11 after passing through the crystal plate 2 is reflected by the rectangular prism 3 and travels through the crystal plate 2, the bilateral reflecting prism 5 and the crystal plate 2 in succession and is incident on the retroreflecting triangular prism 3' and reincident on the crystal plate 2.

On the other hand, the light beam travelling the extraordinary light beam path 21 travels the light path (II) and is reflected two times by the prism 4 as in the case of FIG. 1. In the present embodiment, the distance between the light paths 11 and 21 is also the same as that between the light paths 14 and 24. As a result, the relative displacement and rotation between the interferometer portion surrounded by the two dotted chain lines 8 and the rectangular prism 3, 3', 4 have no effect upon the path difference between these two light paths I and II. In addition, a rotation of either the interferometer portion 8 or prisms 3, 3' or the prism 4 about points on a center axis of the prisms 3, 3' has no effect upon the interference fringes.

As a result, in the present interferometer only a change in direction of the optical axes between the prisms 3, 3' and the prism 4 results in a change in the path difference. In addition, the two wave fronts of the light beams to be interfered with each other are not inclined from the above mentioned inclinations so that stabilized interference fringes are obtained. In the present embodiment, either the retroreflecting triangular prisms 3, 3' or the prism 4 may be used as a movable reflecting mirror.

In FIG. 3 is shown a modified embodiment of the interferometer portion 8 shown in FIG. 1. In this embodiment, the beam splitting plate 2 is replaced by a prism 9. The prism 9 is composed of a triangular prism 91 and a parallelogram prism 92, the latter being separated from the former by a cemented surface which is provided with a polarizing film 93 deposited by vacuum evaporation, etc. As a result 100% of that part of the incident light which is a linear light polarized in the incident plane (hereinafter this is called P polarized light) passes through the polarizing film 93, while 100% of the linear light polarized in a plane normal to the incident plane (hereinafter this is called S polarized light) is reflected by the polarizing film 93.

If the light beam travelling the optical path I be the P polarized light, the incident light 1 after having passed through the polarizing film 93 travels the light path 11, is reflected by the prism 3 then travels the light paths 12, 13 and passes through the bilateral reflecting triangular prism 5.

The light beam emerging from the bilateral reflecting triangular prism 5 is incident on the rotator 6 for rotating the polarizing plane of the light traversing it by 90°, changed into the S polarized light and reflected by the polarizing film 93. The light beam reflected by the polarizing film 93 travels the light path 14 and is reflected by a reflecting part 94 of the parallelogram prism 92 which is opposed to the polarizing film 93 and incident on the retroreflecting triangular prism 4. The light beam incident on the retroreflecting triangular prism 4 is reflected by it, travels the light path 15 and is reflected by the polarizing film 93, travels the light path 16 and arrives at the polarizing plate 7.

If the light beam travelling the optical path II is the S polarized light, the incident light is reflected by the polarizing film 93 and the reflecting part 94, travels the light path 21 and is incident on the retroreflecting triangular prism 4. The light beam incident on the prism 4 is reflected by it, travels the light path 22, is reflected by the reflecting part 94 and the polarizing film 93, travels the light path 13 and arrives at the bilateral reflecting triangular prism 5.

The light beam passing through the prism 5 is incident on the 90° rotator 6 is changed into the P polarized light and passes through the polarizing film 93. The light beam emerging from the polarizing film 93 travels the light path 24, the prism 4, the light path 25, the polarizing film 93 and the light path 16 and arrives at the polarizing plate 7.

The light beams that travel the optical paths I and II when reunited interfere with each other to produce the interference fringes.

The light path I is located outside the light path II with respect to the prisms 3, 4, and the distance between the light paths I and II with respect to the right side of the interferometer is equal to that between the same paths with respect to the left side.

As a result, a change in the relative displacement and relative rotation between the interferometer part and the retroreflecting triangular prisms 3, 4 has no effect upon the path difference between the two light paths I and II so that significantly stable interference fringes can be obtained.

In FIG. 4 is shown a modified embodiment of the bilateral reflecting triangular prism 5 shown in FIGS. 1 to 3. Here the bilateral reflecting triangular prism 5 is replaced by two mutually perpendicular reflecting mirrors 51, 52 between which is arranged the rotator which may be arranged at any position on the light path 13 between the reflecting mirrors 51, 52.

Alternatively, in the embodiments shown in FIGS. 1 to 3, the rotator 6 may be arranged on the light path 13 in front of or in the rear of the bilateral reflecting prism 5.

Each of the rectangular prisms 3, 3' and 4 shown in FIGS. 1 to 3 may also be replaced by two mutually perpendicular reflecting mirrors.

In addition, the retroreflecting triangular prisms 3, 4 may be interchanged such that the path difference between the light paths I and II is produced by the relative change in position between the two prisms 3 and 4.

For example, the prisms 3, 4 shown in FIG. 1 may be rotated by 180° so as to locate the prism 3 at the left side and the prism 4 at the right side of the interferometer.

In FIG. 5 is shown a detector system for photoelectrically detecting the interference fringes obtained by the interferometer according to the invention. The light beam 16 emerging from the interferometer is separated into two light beams by means of a semitransparent mirror 30. The light beam passing through the mirror 30 goes through a quarter-wavelength plate 31 whose polarizing axis is parallel with or perpendicular to the drawing. Reference numerals 32, 33 designate rotators for rotating the polarizing plane of the traversing light by 45°, respectively.

The light beams separated by the semitransparent mirror 30 being rotated by the rotators 32, 33 in their polarizing planes by 45°, are separated by means of polarizing prisms 34, 35 and arrive at light detectors 36, 37 and 38, 39, respectively. The interference fringes produced by the light detectors 36 and 37 are different in phase from each other by 180°.

The outputs from these two light detectors 36, 37 are amplified by a differential amplifier 40 to obtain a signal exclusive of a direct-current component in response to the interference fringes. Similarly, the outputs from the two light detectors 38, 39 are amplified by a differential amplifier 41 to obtain a signal exclusive of a direct-current component in response to the interference fringes. The output signal from the differential amplifier 41 is displaced 90° in phase by means of the ¼ wavelength plate 31 from the output signal from the differential amplifier 40.

These two signals are supplied to a reversible counter 42 which can count the interference fringes produced due to an increase or decrease of the path difference. A part surrounded by two dotted chain lines 43 shows a polarizing element corresponding to the polarizing plate 7 shown in FIGS. 1 to 3.

In front of each of the light detectors 36, 37, 38, 39 may be arranged a polarizing plate, and its polarizing plane may be rotated to adjust the intensity of light incident on these light detectors. As a result, it is possible to count the interference fringes without being influenced by a change in light intensity from a light source.

In the embodiments shown in FIGS. 1 to 3, the light path I is located outside the light path II with respect to the prisms 3, 3', 4 and these two light paths I, II are equally spaced apart from each other, so that the relative displacement and relative rotation between the interferometer part 8 and the retroreflecting triangular prisms 3, 3', 4 have no influence upon the path difference between the two light paths I, II, thereby obtaining extremely stable interference fringes.

In FIG. 6 is shown another embodiment of the interferometer according to the invention. In this embodiment, the incident light 1 which is a linear polarized light having a polarizing plane inclined by 45°, or a circular or elliptical polarized light, is incident on the beam splitter 9 composed of the triangular prism 91 and the parallelogram prism 92, the latter being separated from the former by the cemented surface which is provided with the polarizing film 93 as in the embodiment shown in FIG. 3.

In the present embodiment, substantially 100% of that component of the incident light 1, which is the linearly polarized light oscillating in the incident plane of the film 93, passes through the polarizing film 93, while substantially 100% of that component of the incident light 11, which is the linearly polarized light oscillating in a plane normal to the incident plane of the film 93, is reflected by that film.

The light beam 11 passing through the polarizing film 93 is reflected by the retroreflecting triangular prism 3 and incident again as the light beam 12 on the beam splitter 9. The light beam 12 passing through the film 93 is reflected by the bilateral reflecting triangular prism 5 the edge line of which is perpendicular to that of the retroreflecting triangular prism 3. The light beam reflected by the bilateral reflecting triangular prism 5 passes through the rotator 6 for rotating by 90° the polarizing plane of the light to obtain the linearly polarized light beam the polarizing plane of which is perpendicular to the incident plane of the polarizing film 93.

This light beam is reflected by the film 93 and then reflected by the total reflecting plane 94 of the parallelogram prism 92 to obtain the light beam 14.

The light beam 14 is reflected by the retroreflecting triangular prism 3' to obtain the light beam 15. This beam is reflected by the total reflecting face 94 and the polarizing film 93 passed through the beam splitter 9 and emerges as the light beam 16.

That part of the incident light 1 which is reflected by the film 93 and the plane 94 and passing through the beam splitter 9 is reflected by a cat's eye composed of a lens 17 and a reflecting mirror 18 located at the focal point of the lens 17, and it travels as a light beam 22 in the reverse direction. This light beam 22 after passing through a rotator 19 for rotating by 90° the polarizing plane of the traversing light becomes the linearly polarized light vibrating on a single plane parallel to the incident plane of the polarizing film 93. This light beam is incident on the beam splitter 9 and passes through the film 93.

The light beam passed through the film 93 and the rotator 6 is reflected by the bilateral reflecting triangular prism 5 and is incident on the beam splitter 9. The polarized plane of the light beam 13 is rotated by 90° with respect to the light beam 22 so that the light beam 13 is reflected by the film 93 and the surface 94 and emerges as a light beam 24 from the beam splitter 19. This light beam 24 is reflected by the cat's eye 17, 18 and after having passed through a rotator 20 to produce a linear polarized light 25 vibrating on a single plane parallel with the incident plane of the polarizing film 93. This light beam 25 is incident on the beam splitter 9, passes through the polarizing film 93 and emerges as the light beam 16 from the beam splitter 9.

The combined light beam 16 travels the same light path and passes through a polarizing element 7 the polarizing plane of which is inclined by 45° from the polarizing planes of the combined light beams 16, and as a result, interference fringes can be observed. These interference fringes are detected by photoelectric detectors as shown in FIG. 5, and the amount of movement of the cat's eye 17, 18 can be measured by well known methods.

As seen from the above, the relative displacement and rotation between the interferometer part composed of beam splitter 9, bilateral reflecting triangular prism 5 and rotator 6 on the one hand, and retroreflecting triangular prisms 3, 3' and cat's eye 17, 18 on the other hand, have no effect upon the path difference between the two optical paths whereby stabilized interference fringes can be obtained.

In addition, the interferometer according to the invention is so constructed that the distance between successive fringes corresponds to $\lambda/4$ and the light beam is prevented from being transversely displaced. As a result, distinctiveness of the interference fringes is obtained independently of the alignment of the movable mirror and the like constitutional elements of the interferometer.

In the present embodiment, use may be made of the beam splitting plate or double refraction crystal plate shown in FIGS. 1 and 2 instead of the beam splitter 9 having the polarizing film 93 to obtain the same effect as described above.

In addition, the cat's eye 17, 18 used as the movable mirror may be replaced by a corner cube prism which constitutes the same retroreflecting mirror as the cat's eye. In this case, it is preferable to make one of the edge lines of the reflecting surfaces of the corner cube prism horizontal or vertical. In general, the light beam reflected by the corner cube prism is an elliptical polarized light so that it is desirous to dispose a desired polarizing element at the emergence side of the rotators 19, 20 or to use a wavelength plate for changing the elliptical polarized light into the linearly polarized light instead of the rotators 19, 20.

The rotator 6 is intended to rotate the linearly polarized light by 90° so that it is not always necessary to locate the rotator 6 at the position shown in FIG. 6. The rotator 6 may be disposed at any desired position on the light path 13 between the beam splitter 9 and the bilateral reflecting triangular prism 5. In addition, the rotators 19, 20 may be disposed in the light paths 21, 24 incident on the cat's eye 17, 18. The same may be applied to the above described wavelength plate. Even when the rotators 19, 20 are disposed in the incident light paths 21, 24 of the cat's eye, the polarizing elements must be arranged at the emergence side of the cat's eye 17, 18. Various modifications in the arrangement of the rotator, the wavelength plate or the polarizing element are possible by the knowledge of polarization analysis.

In case of using the beam splitter 9 having the polarizing film 93, if the vibration plane of the incident light is not accurately coincident with the inclination of the polarizing film 93, two light beams emerge from that surface of the beam splitter 9 which is opposed to the total reflecting surface 94 to produce surplus interference fringes having a bad effect upon observation. In order to prevent the production of such surplus interference fringes, the retroreflecting triangular prism 3, 3' and the cat's eye 17, 18 are not arranged in phase, but the former is relatively displaced with respect to the latter such that both light paths passing through the retroreflecting triangular prisms 3, 3', and the light paths passing through the cat's eye 17, 18 do not pass through the same light path in the beam splitter 9. If the inclination of the vibrating plane of the light is precisely aligned with the polarizing film, the relative displacement between the retroreflecting triangular prisms 3, 3' and the cat's eye 17, 18 has no effect upon the interference fringes being observed.

As a light source, a laser is particularly beneficial for precise determination of large lengths, but the light source itself is outside the scope of the inventive. Use may be made of a two-wavelength laser as the laser light source. A representative two-wavelength laser consists in that a magnetic field is applied to an optical axis direction so as to produce the Zeeman effect whereby the wavelengths between the mutually independent circular polarized lights are different from each other.

The use of a ¼ wavelength plate having an axial direction inclined from the horizontal surface by 45° makes it possible to convert two circular polarized lights emitted from the two-wavelength laser into two linearly polarized lights vibrating in horizontal and vertical directions, respectively. If such light beams are incident on the interferometer according to the invention, the light beams travelling the light paths I and II become different in wavelength. If the light beam emerging from the interferometer and passed through the polarizing element is detected by the light detector, there is produced a beat whose frequency is equal to the difference between the frequencies of the two light beams.

In addition, a part of the light incident on the interferometer is taken out by means of a semitransparent mirror, etc. and this taken out light is allowed to pass through the polarizing element and is received by the light detector, thereby detecting a beat between the two polarized lights. The number of beats obtained from these light detectors is counted by means of a counter and then it is possible to obtain from the differences between these two beats counts proportional to the amount of movement of a carriage being measured.

As stated hereinbefore, the invention is capable of obtaining stabilized interference fringes one fringe separation of which corresponds to $\lambda/4$ and making the contrast of the interference fringes independent of the alignment of the movable mirror and the like constitutional elements of the interferometer, thereby reliably and simply effecting a precise determination of lengths.

In FIG. 7 is shown an inventive interferometer embodiment which can measure the pitch or the drunkenness error of screw threads. Referring to FIG. 7, A designates a light beam which is directly incident on a beam splitter 61 having a polarizing film. As a result, the light beam A is separated into a linearly polarized light $a_1$ vibrating on the plane of the drawing in FIG. 7 and a linearly polarized light $b_1$ vibrating on a plane normal to the plane of the drawing in FIG. 7. The linearly polarized light $a_1$ is reflected by a retroreflecting triangular prism 62 to produce a reflected light $a_2$. This light after passing again through the beam splitter 61 is incident on a rotator 63 to produce a linearly polarized light $a_3$ whose polarizing plane is rotated 90° with respect to the light $a_2$. This is incident on a bilateral reflecting triangular prism 64. The above mentioned light path, seen from the front, is shown in FIG. 8.

The linearly polarized light $a_3$ incident on the bilateral reflecting triangular prism 64 is reflected by it to produce a reflected light $a_4$ which is then incident on another beam splitter 65 having a polarizing film. The polarizing plane of the linearly polarized light $a_2$ passed through the beam splitter 61 is rotated by 90° by means of the rotator 63 so that the light $a_4$ is reflected by the polarizing film of a beam splitter 65 which is similar in construction to the beam splitter 61, and it is then reflected by a triangular prism 66 to produce a reflected light $a_5$.

This light is reflected by a retroreflecting triangular prism 67 arranged in a similar manner as the prism 62 to produce a reflected light $a_6$ which is then reflected again by the triangular prism 66 and the polarizing film of the beam splitter 65 in succession, and it emerges from the beam splitter 65 as a linearly polarized light $a_7$. In FIG. 9 is shown the above mentioned light path of the linearly polarized lights $a_5$ and $a_6$ between the triangular prisms 66 and 67 seen from the front of FIG. 1.

The linearly polarized light $b_1$ reflected by the polarizing film of the beam splitter 61 is reflected by a triangular prism 68 to produce a reflected light $b_1'$ which is then reflected by the retroreflecting triangular prism 69 to produce a reflected light $b_2$. This light is reflected again by the triangular prism 68 and the polarizing film of the beam splitter 61 and is incident on the rotator 63 which converts the reflected light $b_2$ into a linearly polarized light $b_3$ vibrating in the plane of the drawing of FIG. 7. This linearly polarized light $b_3$ ravels the same light path as that travelled by the linearly polarized light $a_3$. That is, the linearly polarized light $b_3$ is reflected by the bilateral reflecting triangular prism 64 to produce a beam $b_4$ which is then incident on the beam splitter 65.

This linearly polarized light $b_4$ vibrates in the plane of the drawing of FIG. 7 and hence passes into the beam splitter 65 to produce a penetrated light $b_5$ which is then reflected by the retroreflecting triangular prism 69 to produce a reflected light $b_6$ and it penetrates through the beam splitter 65 as a linearly polarized light $b_7$. In FIG. 10 is shown the light path of the linearly polarized lights $a_4$, $b_4$, $a_7$ and $b_7$.

The linearly polarized lights $a_7$ and $b_7$ emerged from the interferometer, composed of the elements 61 to 69 and having mutually perpendicular polarized planes, are made to interfere with each other by passing them through an optical system 70 having a suitable polarizing element. For example, the linearly polarized lights $a_7$ and $b_7$ may be passed through a polarizing element whose polarizing plane is inclined from the drawing of FIG. 10 by 45°, and as a result, the interference fringes can be observed. These interference fringes are detected by a photoelectric detector 71, and the number of interference fringes may be counted by means of a counter 72 inclusive of a calculator.

In the embodiment of FIG. 10, the retroreflecting triangular prisms 62 and 67 are secured to a carriage 73 as shown in FIG. 7. To the carriage 73 are secured feelers 74 and 75 threadedly engaged with threads of a screw 76 whose pitch is to be measured. The screw 76 is connected at its one end through a chuck 77 to the rotary shaft of a driving motor 78 and is supported at its other end by a tail spindle 80 provided for a tail stock 79. If the screw 76 is rotated by the driving motor 78, the rotation of the screw 76 causes a movement of the carriage 73 along slideways 81 and 81'. As a result, the retroreflecting triangular prisms 62 and 67 secured to the carriage 73 are also moved so that the light path of the light beam $a_7$ emerging from the beam splitter 65 is changed such that the reference fringes are changed with a period of $\lambda/4$.

To the driving shaft of the screw 76, i.e. to the rotary shaft of the driving motor 78 is secured a rotary encoder 82 which can produce a pulse every time the screw 76 is rotated by one revolution. Between the counter 72 and the encoder 82 is connected a printer 73 which can read out the contents of the counter 72 every time the pulses are delivered from the encoder 82 to the printer 73, and as a result, it is possible to measure the total sum of the pitches of the thread of the screw 76. Alternatively, the rotary encoder 82 may be made to generate a pulse every time the screw 76 is rotated by 10°, and the printer 73 may be made to read out the contents of the counter 72. In this case, the drunkeness error of the screw 76 may be measured.

In the above described interferometer for precise determination of lengths according to the invention, if the center axis of the screw 76, and a straight line passing through the center between the two light paths of the linearly polarized lights $a_1$ and $a_2$ and parallel with these light paths (hereinafter called a bisector), are on one plane and the bisector between the linearly polarized lights $a_1$ and $a_5$ and the bisector between the linearly polarized lights $a_2$ and $a_6$ are made coincident with the center axis of the screw 76, the pitch or drunkenness error of the screw 76 can be measured without involving Abbe's error. In this case, the distance between the linearly polarized lights $a_1$ and $b_1'$ is equal to the distance between the linearly polarized lights $a_5$ and $b_5$. As a result, even when the carriage 13 is inclined or displaced transversely, the path difference is not changed at all, thereby obtaining stabilized interference fringes.

In FIG. 11 is shown another embodiment of the interferometer according to the invention in which the part of the interferometer shown in FIG. 7 is modified. In this embodiment, the retroreflecting triangular prism 69 shown in FIG. 7 is replaced by a rotator 84 and a cat's eye 85. The cat's eye 85 is composed of a lens 86 and a reflecting mirror 87 located at the focal point of the lens 86. The other optical systems used in the present embodiment are the same as those used in the embodiment shown in FIG. 7. In the present embodiment, if the cat's eye 85 is connected to the rotary shaft of the driving motor 78, it is possible to obviate a measurement error due to the axial shift of the rotary shaft. For this purpose, in the present embodiment, the driving motor 78 and the tail stock 79 shown in FIG. 7 are reversed in position. Use may be made of a corner cube prism instead of the cat's eye 85.

The light beams corresponding to the linearly polarized lights $a_7$, $b_7$ and emerging from the interferometer shown in FIG. 7 may be incident on the semitransparent mirror 30 shown in FIG. 5, and the interference fringes may be photoelectrically detected in the same manner as described with reference to FIG. 5.

In the embodiments shown in FIGS. 7 and 11, the retroreflecting triangular prisms 62 and 67 are moved, but these prisms may also be made stationary irrespective of the rotation of the screw 76. In this case, a retroreflecting mirror such as the rectangular prism 69 or cat's eye 85 or corner cube prism is mounted on the carriage 13 such that the retroreflecting mirror can be moved in response to the rotation of the screw 76.

In addition, the threads of the screw 76 may be detected by means of a microscope or a photoelectric microscope. The use of such devices makes it possible to detect not only the threads of the screw 76, but also the teeth of a rack or the graduations of a scale.

The number of the movable retroreflecting triangular prisms 62 and 67 is not limited to two, but only one of these prisms may be made movable.

The beam splitters 61 and 65 may be made integral in a single body and the triangular prisms 66 and 68 may also be made integral.

As above mentioned, it is preferable to use a laser light as the light source, but the required or used light source is not limited to a laser light only.

In FIG. 12 is shown an embodiment in which use is made of a two-wavelength laser. Reference numeral 120 designates such a laser operating at two different wavelengths. Two circular polarized lights emitted from the laser 120 are incident on a quarter-wavelength plate 121 whose polarizing axis is inclined from the drawing plane by 45°, that changes these lights into a linearly polarized light vibrating in the drawing plane of FIG. 12, and a linearly polarized light vibrating in the plane normal to the drawing plane.

These linearly polarized lights are incident through a semitransparent mirror 125 on an interferometer 122 inclusive of the optical elements 61 to 69 shown in FIG. 7. The two light beams $a_7$, $b_7$ emerging from the interferometer 122 are incident through a polarizing element 123 on a light detector 124 that detects these light beams so as to obtain a beat which is equal to the difference between the frequencies of these light beams. The semitransparent mirror 125 reflects a part of the incident light, and the reflected light component is incident through a polarizing element 126 on a light detector 127 that can detect the light beam so as to obtain a beat which is equal to the difference between the frequencies of these light beams.

The number of beats obtained by the light detectors 124 and 127 is counted by counters 128 and 129, respectively. Then, the difference between the values counted by these counters 128 and 129 is obtained by a subtractor 130. Thus, it is possible to obtain a counted value which is proportional to the amount of movement of the carriage 73 shown in FIG. 7. The polarizing element 126 and the light detector 127 may be arranged at the left side of the laser 120 as shown by dotted lines with reference numerals 126' and 127', respectively, so as to detect the beat at the incident side of the laser 120 without using the semitransparent mirror 121, the polarizing element 126 and the light detector 127.

The invention does not make use of an autocollimator for the elimination of the Abbe's error so that it is possible to obviate the previously mentioned disadvantage due to the presence of an autocollimator. In addition, the triangular prisms and the beam splitter are arranged in a two-dimensional manner so that adjustment in position of these optical elements as well as the interferometer itself become simple in construction, and it is possible to obviate the Abbe's error.

In accordance with the invention, one interference fringe is shifted every time the rectangular prism is displaced by $\lambda/4$ ($\lambda$ is the wavelength of the incident light used), so that the sensitivity of the interferometer becomes two times higher than that of conventional interferometers and stable interference fringes can be obtained.

In FIG. 13 is shown a further embodiment of the interferometer according to the invention. This embodiment is capable of producing interference fringes whose separations corresponds to $\lambda/4$. In FIG. 13, A designates an incident light beam which is a linearly polarized light vibrating in a plane inclined by 45° from the x and y axes shown in FIG. 13. In the incident light beam A, the light path of the linearly polarized light vibrating in the y direction is shown by reference numerals on the order of 100, while the light path of the linearly polarized light vibrating in the x direction is shown by reference numerals on the order of 200.

The linearly polarized light vibrating in the y direction travels a light path 100 and is incident on a beam splitter 133 composed of two triangular prisms and having a polarizing film on the cemented surface of these two prisms. In the components of the incident light beam A, substantially 100% of the linearly polarized light vibrating in the y direction passes through the beam splitter 133, travels along a light path 101, is incident on a retroreflecting triangular prism 134 and totally reflected so that it travels along a light path 102 and is incident again on the beam splitter 133.

Substantially 100% of this light beam passes through the beam splitter 133, travels a light path 103, is incident on a bilateral reflecting triangular prism 135 and totally reflected so that it travels along a light path 104 and is again incident on the beam splitter 133.

Substantially 100% of this light beam passes through the beam splitter 133, travels a light path 105, then is totally reflected by the bilateral reflecting triangular prism 134 and travels a light path 106 so that it passes through the beam splitter 133 and emerges therefrom and travels along a light path 107 which is parallel with the incident light path 100.

In the components of the incident light beam A, the linearly polarized light vibrating in the x direction travels a light path 200, is incident on the beam splitter 133, substantially 100% of this incident light is reflected by the polarizing film, travels a light path 201, is incident on a bilateral reflecting triangular prism 136 and is totally reflected by it so that it travels along a light path 202 and is incident again on the beam splitter 133. This light beam is reflected by the beam splitter 133, travels a light path 203, is incident on the bilateral reflecting triangular prism 135, is totally reflected by it, travels along a light path 204 and returns to the polarizing film of the beam splitter 133.

Then, substantially 100% of the light beam is reflected by the polarizing film, travels along a light path 205, is incident on the retroreflecting triangular prism 136, is reflected by it, then travels a light path 206, is incident again on the beam splitter 133. Then, this light beam is reflected by it, emerges therefrom, travels a light path 207 which is the same as the light path 107.

The light beam emerging from the beam splitter 133 and travelling the optical paths 107, 207 may be made incident on the semitransparent mirror 30 of the photoelectric detector shown in FIG. 5 so as to photoelectrically detect the interference fringes obtained by the interferometer shown in FIG. 13.

FIG. 14 shows another embodiment of the interferometer according to the invention. The distance between adjacent fringes also corresponds here to λ/4. As seen from FIG. 14, this embodiment is different from the embodiment shown in FIG. 13 in that the incident light beam is normal to the light beam emerging from the interferometer and that two rotators are present in the perpendicular light paths. That is, the incident light beam A travels the light paths 100, 200 and is incident on the polarizing film of the beam splitter 133. Similar to the embodiment shown in FIG. 13, the incident light beam A is of a linearly polarized light vibrating in a plane inclined from the x and y axes by 45°.

Substantially 100% of the linearly polarized light vibrating in the y direction passes through the beam splitter 133, travels the optical path 101, is incident on a rotator 137 for rotating by 90° the polarizing plane of the traversing light. Thus, the incident light is converted into a linearly polarized light vibrating in the x direction. The light beam emerging from the rotator 137 successively travels through retroreflecting triangular prism 134, light path 103, beam splitter 133, light path 104, bilateral reflecting triangular prism 135, light path 105, beam splitter 133, light path 106, retroreflecting triangular prism 134, light path 107, beam splitter 133 and light path 108, emerges from the beam splitter 133 and travels along the light path 108 which is perpendicular to the incident light path 100.

The other component of the incident light beam A which is a linearly polarized light vibrating in the x direction travels the light path 200, and substantially 100% of which is reflected by the beam splitter 133, travels the light path 201 and is incident on the rotator 138 for rotating by 90° the polarizing plane of the traversing light. The light beam emerging from the rotator 138 is converted into a linearly polarized light vibrating in the y direction. This light beam travels the light path 202 and is incident on the bilateral reflecting triangular prism 136, and then successively travels through light path 203, beam splitter 133, light path 204, bilateral reflecting triangular prism 135, light path 205, beam splitter 133, light path 206, retroreflecting triangular prism 136, light path 207, beam splitter 133 and light path 208 which is the same as the light path 108, and is incident on a polarizing plate (not shown). The interference fringes produced by the polarizing plate can be observed. In the present embodiment, use is made of the rotators 137 and 138 which are capable of rotating the light beam emerged therefrom with respect to the incident light beam by 90°.

In FIGS. 15a and 15b is shown another embodiment of the interferometer according to the invention. FIG. 15a is a plan view and FIG. 15b is a side elevation. For ease of illustration, in the latter, the retroreflecting triangular prism 140 is omitted. In these figures, an incident light beam A travels a light path 100 (200) and is incident on a beam splitter 133 having a polarizing film. As described above, substantially 100% of the linearly polarized light vibrating in the x direction is reflected by the polarizing film, while substantially 100% of the linearly polarized light vibrating in the y direction passes through the film.

The light beam passing through the film travels successively through a light path 101, retroreflecting triangular prism 134, light path 102, beam splitter 133, light path 103, bilateral reflecting triangular prism 136, light path 104, beam splitter 133, light path 105, retroreflecting triangular prism 134, light path 106, beam splitter 133, light path 107, bilateral reflecting triangular prism 139, light path 108, beam splitter 133, light path 109, retroreflecting triangular prism 134, light path 110, beam splitter 113, light path 111, bilateral reflecting triangular prism 136, light path 112, beam splitter 133, light path 113, retroreflecting triangular prism 134, light path 114, beam splitter 133 and emerges from the latter through a light path 115 which is parallel with the incident light path 100.

In this embodiment, no rotator is present in the optical path throughout the interferometer and the emerging optical path 115. Similar to the embodiments shown in FIGS. 13 and 14, the beam splitter 133 is composed of two triangular prisms 131 and 132 and provided with a polarizing film on the cemented surface of these two prisms 131 and 132.

The linearly polarizing light incident along the light path 200 on the beam splitter 133 and vibrating in the x direction travels light paths 201 to 214 and passes through the beam splitter 133 and the bilateral reflecting triangular prism 136, 139 as well as the retroreflecting triangular prism 134 and arrives at a light path 215. Thus, the linearly polarized lights vibrating in the y and x directions are both incident on the above described polarizing plate (not shown), thereby detecting the interference fringes. This embodiment makes it possible to elongate the reflected light path, make one fringe correspond to λ/8 and further to increase the sensitivity of the interferometer.

In FIG. 16 is shown a still further embodiment of the interferometer according to the invention. Two rotators 141, 142 are added here to the embodiment shown in FIGS. 15a, 15b for the purpose of making the emerging light beam perpendicular to the incident light beam. That is, the incident light beam A travels the light path 100, 200 and is incident on the beam splitter 133 composed of two triangular prisms and having a polarizing film on the cemented surface of these prisms.

This incident light beam is separated into two linearly polarized lights vibrating in the x and y directions, respectively. The light vibrating in the y direction passes through the beam splitter 133, travels along the light path 101, is incident on the rotator 141 and polarized in the x direction. This polarized light travels along the light path 102, is incident on the retroreflecting triangular prism 134, is reflected, travels along the light path 103 and is again incident on the beam splitter 133. Since the light beam is polarized in the x direction, it is reflected by the beam splitter 133, travels a light path 104, is incident on a bilateral reflecting triangular prism 136, then travels light paths 105 to 115 in succession and finally emerges from the bilateral reflecting triangular prism 136 through an exit light path 116 which is perependicular to the incident light path 100.

The linearly polarized light vibrating in the x direction and reflected by the beam splitter 133 travels an optical path 201 and is incident on the rotator 142 which polarizes the incident light in the y direction. This light travels an optical path 202, is incident on the retroreflecting rectangular prism 140 and is reflected by it. The reflected light travels a light path 203 and is incident again on the beam splitter 133. Since this light beam is polarized in the y direction, it passes through the beam splitter 133, travels a light path 204 and is incident on the bilateral reflecting triangular prism 136. Then, the light beam travels the optical paths 205 to 215 and finally emerges through an exit light path 216 which is common to the light path 116. A polarizing element (not shown) is provided for the exit light paths 116, 216 so as to produce the interference fringes to be observed.

As stated hereinbefore, the interferometer according to the invention is capable of making the light path traversing the bilateral reflecting triangular prism common to both the reference light beam and the measuring light beam, and hence substantially reducing the influence of an error produced in the manufacturing of those parts upon the interference fringes.

The retroreflecting rectangular prisms may be replaced by a cat's eye, a corner cube prism, two reflecting mirrors and the like.

The retroreflecting rectangular prisms may be rotated about the optical axis by 90°. In this case, it is also possible to obtain the effect as described above. The number of the retroreflecting rectangular prisms and rotators may be increased to obtain high sensitivity.

In FIG. 17 is shown another embodiment of the interferometer according to the invention. This embodiment permits of obtaining interference fringes one fringe separation of which corresponds to λ/8. An incident light travels the light path 100, 200 and is incident on a beam splitter composed of a parallelogram prism 171 and a triangular prism 172 separated therefrom by a polarizing film 173, and separated into linearly polarized lights vibrating in the $x$ and $y$ directions.

Substantially 100% of the linearly polarized light vibrating in the $x$ direction is reflected by the polarizing film 173 and substantially 100% of the linearly polarized light vibrating in the $y$ direction passes through the film 173. The light then travels a light path 101 and is reflected by a retroreflecting triangular prism 174. The reflected light travels a light path 102, re-enters the beam splitter and is incident on a rotator 175 by which the polarizing plane is rotated by 90°.

The light emerging from the rotator 175 and having its polarizing plane in the $x$ direction travels a light path 103 and is reflected by a bilateral reflecting triangular prism 176. The reflected light travels a light path 104 and is incident again on the beam splitter 171. Now, the light is reflected by the polarizing film 173 and then reflected by a reflecting surface 177 so that it travels a light path 105. The light is then reflected by a retroreflecting triangular prism 178, travels a light path 106, and again passes through the parallelogram prism 171 and travels a light path 107. This light is reflected by the bilateral reflecting triangular prism 179, travels a light path 108, is incident again on the beam splitter. Then, the light is reflected twice by the parallelogram prism 171, travels a light path 109 and then is reflected by a retroreflecting triangular prism 178.

The reflected light travels a light path 110, passes again through the parallelogram prism 171 and passes through another rotator 180 which converts the light into a linearly polarized light vibrating in the $y$ direction. This polarized light is reflected by the bilateral reflecting triangular prism 176, travels a light path 112 and passes through the beam splitter. The light emerging from the beam splitter travels a light path 113 and is reflected by the retroreflecting triangular prism 174. The reflected light travels a light path 114, passes through the beam splitter and travels a light path 115.

The linearly polarized light vibrating in the $x$ direction travels a light path 200, is reflected twice by the parallelogram prism 171 and then travels a light path 201. This light is reflected by a retroreflecting triangular prism 181, travels a light path 202 and then is reflected twice by the parallelogram prism 171. The reflected light passes through the beam splitter and is incident on the rotator 175 by which the polarized light is changed into the linearly polarized light vibrating in the $y$ direction. This polarized light travels a light path 203, is reflected by a bilateral reflecting triangular prism 176, travels a light path 204 and is incident on the beam splitter. Now, this light passes through the polarizing surface 173 and travels a light path 205. The light is then reflected by the retroreflecting triangular prism 181, travels a light path 206 and passes through the beam splitter.

The latter light travels a light path 207 and is reflected by the bilateral reflecting triangular prism 179. Then, the light travels a light path 208, is incident again on the beam splitter and passes through the polarizing film 173. Then, the light travels a light path 209, is reflected by the retroreflecting triangular prism 181 and travels a light path 210. The light then passes through the beam splitter and is incident on the rotator 180 which changes the light into a linearly polarized light vibrating in the $x$ direction.

This light travels a light path 211, is reflected by the bilateral reflecting triangular prism 176, travels a light path 212 and is incident again on the beam splitter. This light is reflected twice by the parallelogram prism 171, travels a light path 213, is reflected by the retroreflecting triangular prism 181 and travels a light path 214. Then, the light is reflected twice by the parallelogram prism 171, emerges from the beam splitter and travels a light path 215. The light paths 215 and 115 are the same, and the two incident linearly polarized lights are finally reunited in the same path.

Let the incident light be a linearly polarized light, a circularly polarized light or an elliptically polarized light vibrating in a direction inclined from the $x$-$y$ axis by 45°. Then a polarizing plate whose polarizing plane is inclined from the light paths 115, 215 disposed on these light paths enables an observation of the interference fringes. If provision is made for a light detector in the rear of the polarizing plate, it is possible to photoelectrically detect the interference fringes.

In FIG. 18 is shown a detector for photoelectrically detecting the interference fringes obtained by the interferometer shown in FIG. 17. The light emerging from the interferometer and travelling the light paths 115, 215 is separated by means of a semitransparent mirror 182 into two parts. The light through the mirror 182 passes through a rotator 183 and then is separated into two parts by means of a polarizing prism 184. The light passes through the prism 184 is a linearly polarized light vibrating in the drawing plane and obtained by superimposing the two linearly polarized light components of the incident light entering the interferometer. This light can be detected by means of a light detector 185 as interference fringes.

The light reflected by the polarizing prism 184 is a linearly polarized light vibrating in the direction perpendicular to the drawing plane. It can be detected by means of a light detector 186 as interference fringes as in the case of the light through the prism 184. The interference fringes detected by the light detector 186 are displaced in phase by 180° from those detected by the light detector 185. If the outputs from the two light detectors 185, 186 are supplied to a differential amplifier, it is possible to detect that component of the two interference fringes which changes in intensity of light of the two interference fringes.

The light reflected by the semitransparent mirror 182 passes through a quarter-wavelength plate 187 whose polarizing plane coincides with the drawing plane and a rotator 188 for rotating by 45° the polarizing plane of the light, and is separated into two parts by means of a polarizing prism 189. Interference fringes are detected by light detectors 190 and 191. The outputs from the light detectors 190, 191 are supplied to a differential amplifier to obtain an output which is proportional to a difference in intensity between the two interference fringes. The output thus obtained is displaced in phase from the above mentioned output by 90°. The outputs from these two differential amplifiers may be used to count the number of interference fringes and measure very small linear displacements of the object, to be determined in a conventional manner. All of the well known methods of detecting interference fringes between two polarized lights may be used for the purpose of detecting the reference fringes.

The interferometer according to the invention is capable of using a laser as a light source, operating at two wavelengths. That is, the light emitted from the two-wavelength laser is converted into a linearly polarized light having different wavelengths in the $x$ and $y$ directions, and this polarized light is incident on the interferometer according to the invention. Then, the polarized light passes through a plate whose polarizing plane is inclined from the $x$ and $y$ axes by 45° to detect the interference fringes. The path difference may be measured by comparing a beat which is equal to the difference between the frequencies of the two components with a beat detected at the laser side in a similar manner.

In the embodiment shown in FIG. 17, if the retroreflecting triangular prism 181 is displaced in the direction of the light beam with respect to the other retroreflecting triangular prisms 174, 178, the interference fringes are displaced by one fringe every time the prism 181 is moved by $\lambda/8$. As a result, interference fringes are obtained where one fringe corresponds to $\lambda/8$, thus significantly increasing the sensitivity of the interferometer.

The bilateral reflecting triangular prism 179 may be mounted in ways other than shown in FIG. 17 within the scope of this invention. The prism 179, however, must not interrupt the incident light path 100, 200.

In FIG. 19 the bilateral reflecting rectangular prism 179 is shown inclined by 90° from the prism 179 shown in FIG. 17.

In FIG. 20 the prisms 176, 179 of FIG. 19 are combined with the interferometer of FIG. 17, seen from the incident light side. The reference numerals in FIG. 20 designate light paths corresponding to those shown in FIG. 17. As will be seen from a comparison of FIGS. 17 and 20, the light paths are different in arrangement, but the two embodiments are the same in effect. In the embodiment of FIG. 20, the distance between adjacent fringes corresponds to $\lambda/8$.

In the embodiments shown in FIGS. 17 and 20, the rotator 175 may be disposed on the light path 104, 204, and the rotator 180 may be disposed on the light path 112, 212. Alternatively, either one of the rotators 175, 180 may be disposed in the manner as described above.

In FIG. 21 are shown optical elements arranged to obtain interference fringes one fringe separation of which corresponds to $\lambda/16$ and seen from the incident light side. In this embodiment, another bilateral reflecting rectangular prism 192 is arranged adjacent to the bilateral reflecting prism 179. Reference numerals 193, 194 designate rotators for rotating by 90° the polarizing planes of the lights traversing them. The reference numerals designating light paths correspond to those shown in FIG. 17. Reference numerals 131, 231 designate light paths emerging from the interferometer. This embodiment is capable of detecting interference fringes in the same manner as in the embodiment shown in FIG. 17.

The rotator 175 may be disposed on the light path 104, 204 the rotator 180 on the light path 112, 212, the rotator 193 on the light path 119, 219 and the rotator 194 on the light path 127, 227. Alternatively, a suitable number of these rotators may be changed in their positions as in the embodiment shown in FIG. 17.

In the embodiment shown in FIG. 21, the prism 179 may be divided into upper and lower halves. If use is made of the upper half only of the prism 179, the light path 123, 223 or 124, 224 becomes an exit light path. In this case, one fringe separation corresponds to $\lambda/12$. If the interference fringes are detected on the light path 128, 228 or 127, one fringe separation corresponds to $\lambda/14$. If the interference fringes are detected on the light path 124, 224 or 123, 223, one fringe separation corresponds to $\lambda/12$. If the interference fringes are detected on the light path 120, 220 or 119, 219, one fringe separation corresponds to $\lambda/10$. If the interference fringes are detected on the light path 112, 212 or 111, 211, one fringe separation corresponds to $\lambda/6$.

As seen from the above, a combination of the bilateral reflecting rectangular prisms provides an interferometer which can detect interference fringes one fringe separation of which corresponds to $\lambda/2N$ (N is an integer not smaller than 3). The light reciprocates a number of times between the reference retroreflecting triangular prisms 174, 178 or the measuring retroreflecting triangular prism 181 on the one hand, and the light path folding bilateral reflecting triangular prisms 176, 179, 192 on the other hand, so that there is a risk of the light beam being diverged by the diffraction. Such divergence of the light is easily avoided when a convex lens having a suitable focal length is inserted between the beam splitter and the light path folding bilateral reflecting triangular prism. This measure is particularly effective for a light beam whose diameter is not larger than 1 millimeter.

In the above described embodiments, two reflecting mirrors may be substituted for each of the bilateral reflecting triangular prisms. In addition, a cat's eye or a corner cube prism may be substituted for the measuring retroreflecting triangular prism 181. In this case, it is necessary to arrange a rotator 197 for rotating the polarizing plane of the light traversing it by 90° in front and at the upper half of a cat's eye 195, 196 as shown in FIG. 22 or in front and at the upper half of a corner cube prism 198 as shown in FIG. 7. The rotator 197 may also be arranged in front and at the lower half of the cat's eye 195, 196 as shown by dotted lines in FIG. 22 or in front and at the lower half of the corner cube prism 198 as shown by dotted leines in FIG. 23.

In the embodiment shown in FIG. 23, the characteristic of the rotator 197 must be determined by taking the polarizing property of the corner cube prism 198 into consideration. In this case, it is important that the polarizing plane of the incident light is perpendicular to the polarizing plane of the exiting light.

In general, the light reflected by the corner cube prism is an elliptically polarized light. In order to change such a light into the desired linearly polarized light, use may be made of a retardation plate having a desired phase difference between the two components of the polarized light traversing it. Such wavelength plate is easily designed and manufactured by those skilled in the art.

As stated hereinbefore, the invention is capable of providing a highly sensitive interferometer in an easy manner. As seen from the above, the light paths traversing the light path folding bilateral reflecting triangular prisms are common to those traversing the reference and measuring retroreflecting triangular prisms so that the allowable error of the light path folding bilateral reflecting triangular prisms has substantially no effect upon the interference fringes.

In FIG. 24 is shown another embodiment in which the retroreflecting prisms 174 and 181 shown in FIG. 17, the prism 174 being trapezoidal in form, are rotated in a plane perpendicular to the incident light by 90°, respectively. This embodiment makes it possible to displace the interference fringes by one fringe every time the retroreflecting prism 174 or 181 is moved by λ/8. In FIG. 24, reference numerals 229, 230, 231, 232, 233, 234, 235, 236 designate rotators, each rotating the polarizing plane of the traversing light by 90°.

In the embodiment of FIG. 24, the three bilateral reflecting triangular prisms 176, 179, 192 of FIG. 21 are replaced by two bilateral reflecting triangular prisms 176, 179 so as to provide an interferometer which can produce interference fringes in which the distance between adjacent fringes corresponds to λ/16 by suitably inserting into the light paths rotators for rotating by 90° the polarizing plane of the light, as shown in FIG. 24.

The arrangement of the bilateral reflecting triangular prisms 176, 179 may be freely selected by suitably inserting the rotators by taking into consideration the polarizing directions of the light beams to interfere with each other. The bilateral reflecting triangular prism 179 only may be disposed at the incident light side. In this case, the 90° rotators may be inserted into the light paths 107, 207 and 111, 211, respectively.

In the embodiment shown in FIG. 17, it is also possible to make the light emerge that has two components to interfere in the y direction.

A number of such modifications are possible by taking into consideration the successive position of the rotators and the arrangement of the light path folding bilateral reflecting prisms.

Particularly, if the number of the light path folding bilateral reflecting prisms is increased, the number of modifications is considerably increased.

Sensitivity can be redoubled if the exiting light path 131, 231 shown in FIG. 21 is folded back toward the beam splitter by another bilateral reflecting triangular prism. In this case, however, 90° rotators must be inserted in the light paths connecting the rotators 175 and 194, and the rotators 180 and 193, respectively. As can be seen from the above, the sensitivity of the interferometer can be made higher by adding bilateral reflecting triangular prisms and hence adding rotators for rotating the polarizing planes of the traversing lights.

In the embodiment shown in FIGS. 17 to 21, the incident and the light paths reflected on and by the bilateral reflecting triangular prisms 174, 178, 181 are symmetrically arranged with respect to the center of the retroreflecting triangular prism 181. As a result, a change of the path difference is determined by the relative displacement between the prism 181 and the prisms 174, 178 independently of the inclination of these prisms, thereby providing a highly precise and stable interferometer.

In the above embodiments, use is made of a beam splitter provided with a polarizing film, but use may also be made of a beam splitter made of calcite crystal and the like. That is, a parallelogram crystal plate having two parallel planes, whose optical axis is inclined from the direction of the incident light by a certain angle, is capable of dividing the incident light into an ordinary ray or beam and an extraordinary ray so that such a crystal plate may also be used as a beam splitter.

In FIG. 25 is shown an embodiment of the invention in which use is made of the above mentioned parallelogram crystal plate as the beam splitter. Reference numeral 237 designates a parallelogram crystal plate having parallel planes. The light beam incident in a direction perpendicular to the crystal plate 237 is separated into two beams 101, 201 as shown. The beam 101 corresponds to the extraordinary ray or beam and the beam 201 corresponds to the ordinary ray. Each beam travels in a manner similar to the previously mentioned embodiments and leaves the beam splitter to produce interference fringes by means of a polarizing optical system.

As stated hereinbefore, the invention is capable of not only measuring minute displacement but also of measuring the pitch or drunkenness error of screw threads, or the pitch of a rack.

The interferometer according to the invention comprises beam splitting means for dividing an incident light beam into two linearly polarized beams, a reference and measuring retroreflecting optical system for reflecting the divided polarized beams, another bilateral reflecting optical system, and means for rotating by 90° the polarizing planes of the traversing lights, inserted in the light paths. The interferometer operates in reflecting the divided beams by the optical system upon the beam splitter, reflecting again the light beam passing through the beam splitter upon itself by another bilateral reflecting optical system, and reflecting again the light beam passed through the beam splitter by the reference and measuring retroreflecting optical system upon the beam splitter. Then all these operations are repeated.

In the specification, the term retroreflecting optical system shall be understood to include a bilateral reflecting optical system (bilateral reflecting prism, a bilateral reflecting mirror), trilateral reflecting optical system (trilateral reflecting prism which is a so-called corner cube prism or trilateral mirror) or a cat's eye.

What is claimed is:

1. An interferometer for precise determination of lengths of objects, comprising a light source; various optical elements, including a beam splitter for splitting the beam of light incident thereon from said light source into a measuring light beam and a reference light beam, said beams having a mutually orthogonal polarization; a plurality of retroreflectors classified into two groups, both groups having at least one retroreflecting element, all of said retroreflectors in both groups being mechanically connected for common movement; the retroreflectors in one group being independently movable relative to the retroreflectors in the other group; said retroreflectors redirecting both light beams through said beam splitter such that said light beams are recombined so as to emerge from said beam splitter following a common path; at least one bilateral reflector for redirecting the recombined light beam to be incident again on said beam splitter at a location distinct from the location wherein said recombined beam emerged, whereupon said recombined beam is split again into a second measuring beam and a second reference beam which, in turn, are incident on said retroreflectors; after at least one passage through said at least one bilateral reflector a further recombined beam emerges from said beam splitter; and means for detecting interference existing in said further recombined beam incident thereon; said various optical elements being so situated that each measuring beam and each reference beam suffers the same total number of passes through all said retroreflectors and the same total number of passes through all of said at least one bilateral reflector; the total number of passes made by said second measuring beam by said retroreflectors that constitute one of said groups is different from the number of passes made by said second reference beam through said retroreflectors that constitute said one group.

2. The interferometer as defined in claim 1, wherein at least one of said retroreflectors is a bilateral mirror.

3. The interferometer as defined in claim 2, wherein said one group of retroreflectors includes two of said retroreflecting elements, and said other group includes one of said retroreflecting elements in the form of a cat's eye composed of a lens and a reflecting mirror, the latter being located at the focal point of said lens and arranged between said two retroreflecting elements of the one group; and further comprising means for rotating by 90° the respective beams, arranged between said beam splitter and said at least one bilateral reflector, on the one hand, and said beam splitter and said cat's eye, on the other hand.

4. The interferometer as defined in claim 1, wherein said beam splitter consists of a double-reflection crystal plate having an optical axis that is inclined from the direction of the incident beam of light from said light source, for dividing that beam, and further comprising rotator means arranged in a first light path between said at least one bilateral reflector and said crystal plate for rotating by 90° the polarizing plane of the transmitted light.

5. The interferometer as defined in claim 4, further comprising another one of said bilateral reflectors, arranged adjacent said one bilateral reflector, and another rotator means in a second light path which is separated from said first light path, for rotating by 90° the polarizing plane of the transmitted light.

6. The interferometer as defined in claim 1, wherein said retroreflectors include three of said retroreflecting elements.

7. The interferometer as defined in claim 1, wherein said beam splitter is a compound prism including a triangular prism and a parallelogram prism, the latter being separated from said triangular prism by a cemented surface provided with a polarizing film; and further comprising rotator means arranged between said compound prism and said bilateral reflector for rotating by 90° the polarizing plane of the transmitted light.

8. The interferometer as defined in claim 1, wherein said at least one bilateral reflector is in the form of two mutually perpendicular reflecting mirrors; and further comprising rotator means arranged between said mirrors for rotating by 90° the polarizing plane of the transmitted light.

9. The interferometer as defined in claim 1, wherein said means for detecting interference in said further recombined beam incident on said beam splitter includes a semi-transparent mirror for separating said further recombined beam incident thereon into two separate light beams; a quarter-wavelength plate for displacing in phase one of said separate light beams incident thereon by 90° from the other of said separate light beams; means for rotating by 45° the polarizing planes of the traversing lights; and polarizing prisms for separating each of said two light beams incident thereon from said rotating means into two further light beams.

10. The interferometer as defined in claim 9, further comprising four light detectors, each arranged in a light path emerging from said polarizing prisms and producing interference fringes different in phase from each other by 180°; two differential amplifiers arranged in the two light paths emerging from said light detectors and delivering two signals displaced in phase by 90° from each other; and a reversible counter supplied with said two signals, for counting the interference fringes produced by the path difference.

11. The interferometer as defined in claim 10, further comprising two of said bilateral reflectors arranged adjacent each other, and further comprising another rotating means in a light path which is separated from the light path in which said rotating means is arranged, said other rotating means providing rotation by 90° of the polarizing plane of the transmitted light.

12. The interferometer as defined in claim 10, wherein said retroreflectors include three of said retroreflecting elements.

13. The interferometer as defined in claim 10, wherein said at least one bilateral reflector includes three of said bilateral reflecting elements arranged adjacent each other, and further comprising another rotating means in the light path in which said rotating means is arranged, for rotating by 90° the polarizing plane of the transmitted light.

14. The interferometer as defined in claim 1, wherein said one group of retroreflectors includes one of said retroreflecting elements in the form of a trapezoidal prism, and said other group includes another one of said retroreflecting elements in the form of a triangular prism, respectively located in positions rotated by 90° in a plane perpendicular to the incident light beam; and a number of rotator means arranged between said beam splitter and said retroreflecting elements for rotating by 90° the traversing light beam.

* * * * *